United States Patent
Jabbarnezhad

(10) Patent No.: US 6,388,988 B1
(45) Date of Patent: May 14, 2002

(54) METHOD AND SYSTEM FOR AUTOMATIC LINE PROTECTION SWITCHING OF EMBEDDED CHANNELS

(75) Inventor: Javid Jabbarnezhad, Parker, TX (US)

(73) Assignee: Electronic Data Systems Corporation, Plano, TX (US)

( * ) Notice: Subject to any disclaimer, the term of this patent is extended or adjusted under 35 U.S.C. 154(b) by 0 days.

(21) Appl. No.: 09/129,199

(22) Filed: Aug. 4, 1998

(51) Int. Cl.[7] .............................. H04J 3/14; H04L 12/26
(52) U.S. Cl. .................... 370/228; 370/244; 370/401; 340/825.01; 709/239
(58) Field of Search ................................ 370/216, 217, 370/218, 225, 228, 242, 244, 250, 252, 254, 389, 395, 401, 465; 340/825.01, 2.1, 3.1, 3.43; 709/238, 239; 714/1, 2, 3, 4

(56) References Cited

U.S. PATENT DOCUMENTS

| | | | |
|---|---|---|---|
| 5,010,550 A | * | 4/1991 | Hirata ........................ 371/8.1 |
| 5,193,086 A | * | 3/1993 | Satomi et al. ................ 370/16 |
| 5,313,456 A | * | 5/1994 | Sugawara .................... 370/16 |
| 5,483,519 A | * | 1/1996 | Satomi et al. ................ 370/16 |
| 5,600,644 A | | 2/1997 | Chang et al. ............... 370/404 |
| 5,600,798 A | | 2/1997 | Cherukuri et al. ..... 395/200.13 |
| 5,734,654 A | | 3/1998 | Shirai et al. ................ 370/396 |
| 5,748,617 A | | 5/1998 | McLain, Jr. ................ 370/244 |
| 5,751,971 A | | 5/1998 | Dobbins et al. ....... 395/200.68 |
| 5,754,547 A | | 5/1998 | Nakazawa ................... 370/401 |
| 5,870,382 A | * | 2/1999 | Tounai et al. ............... 370/220 |
| 5,987,526 A | * | 11/1999 | Morales ...................... 709/249 |
| 6,038,219 A | * | 3/2000 | Mawhinney et al. ........ 370/242 |

* cited by examiner

Primary Examiner—Alpus H. Hsu
(74) Attorney, Agent, or Firm—Baker Botts L.L.P.

(57) ABSTRACT

A communications network includes a transmit node and a receive node. A first transmission line extends between the transmit and receive nodes and includes a primary embedded channel for carrying channel traffic between the nodes and normal operation. A second transmission line extends between the transmit and receive nodes and includes a secondary embedded channel for carrying the channel traffic between the nodes in the event of a fault condition on the primary embedded channel. The transmit node is operable to automatically switch transmission of the channel traffic from the primary embedded channel to the secondary embedded channel in response to a fault condition being detected in the primary embedded channel at the transmit node. The receive node is operable to automatically switch reception of the channel traffic from the primary embedded channel to the secondary embedded channel in response to detection of the same fault in the primary embedded channel by the receive node.

20 Claims, 3 Drawing Sheets

METHOD AND SYSTEM FOR AUTOMATIC LINE PROTECTION SWITCHING OF EMBEDDED CHANNELS

RELATED APPLICATIONS

This application is related to copending U.S. patent application Ser. No. 09/129,585, entitled "METHOD AND SYSTEM FOR REMOTE MANAGEMENT OF EQUIPMENT HAVING DUPLICATE NETWORK ADDRESSES," filed Aug. 4, 1998 by inventor, Javid (nmi) Jabbarnezhad and U.S. patent application Ser. No. 09/129,201, entitled "SYSTEM AND METHOD FOR EMULATING A DISTRIBUTED NETWORK," filed Aug. 4, 1998, by inventor Javid (nmi) Jabbarnezhad.

TECHNICAL FIELD OF THE INVENTION

The present invention relates generally to protection switching in a network, and more particularly to a method and system for automatic line protection switching of embedded channels.

BACKGROUND OF THE INVENTION

With the move toward decentralized processing, users have interconnected workstations, computers and other types of local equipment through local area networks (LANs). More recently, as users move toward global communications that allow equipment to appear as if it were attached to the local area network, local area networks have been interconnected through wide area networks (WANs).

Frame relay is a packet-switching protocol used in wide area networks that has become popular for interconnection of remote local area networks. The packets are in the form of frames which are variable in length. The key advantage to this approach is that a frame relay network can accommodate data packets of various sizes associated with virtually any native data protocol. Thus, a frame relay network is completely protocol independent because it does not undertake a lengthy protocol conversion process. In this way, frame relay offers faster and less-expensive switching between local area networks.

Private virtual channels (PVC) have been defined within backbone trunks of frame relay networks to provide what appears to be dedicated lines without the cost associated with a dedicated line. Because the trunks are shared among all users of the frame relay network, however, protection switching is not independently provided for the private virtual channels. In addition, transmission on the private virtual channels is subject to congestion protocols and may be prohibited in times of high congestion. As a result, private virtual channels are not robust and are unsuitable for applications requiring reliable communications.

SUMMARY OF THE INVENTION

In accordance with the present invention, an automatic line protection switching method and system for embedded channels are provided that substantially eliminate or reduce disadvantages or problems associated with previously developed systems and methods. In particular, the present invention provides an automatic protection switching system and method that switches embedded channels, such as private virtual channels (PVC), independently of backbone trunks.

In one embodiment of the present invention, a communications network includes a transmit node and a receive node. A first transmission line extends between the transmit and receive nodes and includes a primary embedded channel for carrying channel traffic between the nodes and normal operation. A second transmission line extends between the transmit and receive nodes and includes a secondary embedded channel for carrying the channel traffic between the nodes in the event of a fault condition on the primary embedded channel. The transmit node is operable to automatically switch transmission of the channel traffic from the primary embedded channel to the secondary embedded channel in response to a fault condition being detected in the primary embedded channel at the transmit node. The receive node is operable to automatically switch reception of the channel traffic from the primary embedded channel to the secondary embedded channel in response to detection of the same fault in the primary embedded channel by the receive node.

More specifically, in accordance with a particular embodiment of the present invention, the transmit and receive nodes are routers that monitor the transmission lines and embedded channels, the transmission lines are network trunks and the embedded channels are private virtual channels defined within the network trunks. In this and other embodiments, the fault condition may be a bit error rate of the primary channel below $10^{-6}$.

The transmit and receive nodes may each be further operable to independently monitor the primary embedded channel for a non fault condition and to automatically switch transmission or reception of channel traffic from the secondary embedded channel to the primary embedded channel in response to the non fault condition. The non fault condition may be a bit error rate of the primary channel above $10^{-4}$.

Technical advantages of the present invention include providing automatic line protection switching for embedded channels in a communications network. In particular, protection switching is provided for the embedded channel independent of the trunk transmission line. This is accomplished by independently monitoring and switching between primary and secondary embedded channels at each end of the embedded channel in response to a same fault condition. As a result, a robust management or other network requiring high reliability may be created using embedded channels.

Other technical advantages of the present invention will be readily apparent to one skilled in the art from the following figures, descriptions, and claims.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

Figure 1:
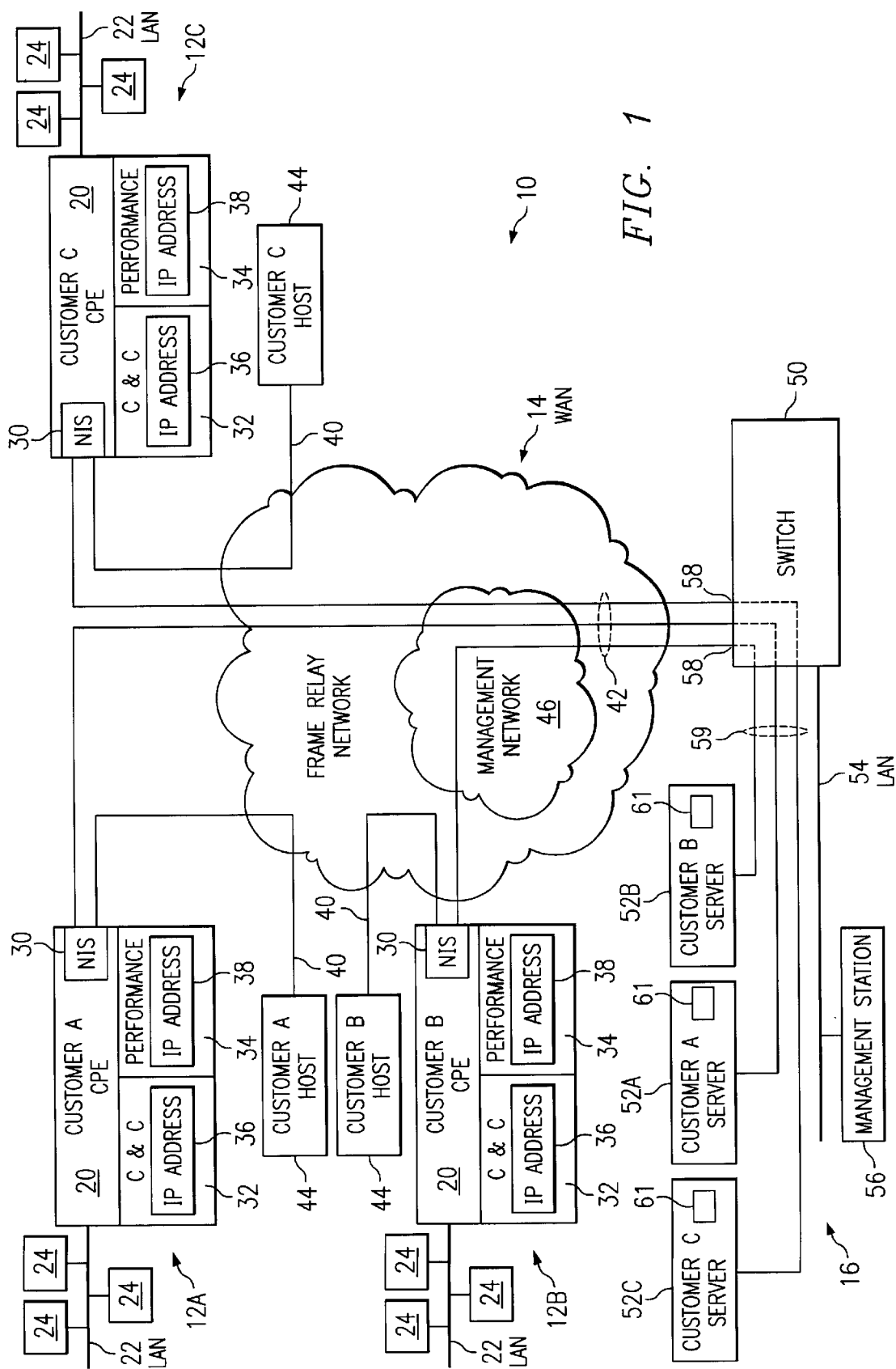
FIG. 1 is a schematic block diagram illustrating a communications system for remote management of customer premise equipment in accordance with one embodiment of the present invention.

FIG. 1 illustrates a communications system 10 for remote management of customer equipment in accordance with one embodiment of the present invention. The communications system 10 includes a plurality of customer sites 12A, 12B and 12C connected through a communications network to a management site 16. The customer site 14 may be globally distributed and thus remote from each other and the management site 16.

Referring to FIG. 1, each of customer site 12 includes an item of customer premise equipment (CPE) 20, a local area network (LAN) 22, and a local network equipment 24. The customer premise equipment 20 may be a telephony switch, other telephony equipment, or other type of equipment that is remotely distributed and operated.

The customer premise equipment 20 includes a network interface system (NIS) 30, a command and control (C&C) system 32, and a performance (Perf.) system 34. The network interface system 30 connects the customer premise equipment 20 to the communications network 14. For the embodiment of FIG. 1 in which the communications network is a frame relay network, the network interface system is a frame relay with router (FRAD). The frame relay with router encapsulates and decapsulates messages and data transmitted and received over the communications network 14.

The command and control system 32 includes software that manages the operation of the customer premise equipment 20 and the local network equipment 24 through the customer premise equipment 20. The command and control system 32 includes a network address 36 with which the command and control system 32 can be accessed. In one embodiment, the network address 36 is an Internet Protocol (IP) address. The Internet Protocol address is a 32-bit address that includes a network portion and a host portion for efficient routing.

The performance system 34 includes software and memory for monitoring, recording, and storing performance data for the customer premise equipment 20 and the local network equipment 24 through the customer premise equipment 20. The performance system 34 includes a network address 38 with which the performance system 34 can be accessed. In one embodiment, the network address 38 is an Internet Protocol address.

Because the Internet Protocol addresses of the command and control systems 32 and the performance systems 34 are independently assigned by each customer, the Internet Protocol addresses may be duplicated between the customer premise equipment 20. For example, the command and control system 32 of customer A's premise equipment 20 may have the same Internet Protocol address as the command and control system 32 for customer B's premise equipment 20. Similarly, the performance system 34 for customer C's premise equipment 20 may have that same Internet Protocol address. As described in more detail below, the present invention allows such systems and equipment having duplicate Internet Protocol addresses to be individually accessed and remotely managed over an open network. An open network is a public network or other network in which network addresses may be duplicated.

The local area network 22 of each customer site 12 is connected to a network port of the customer premise equipment 20 of that site. The local area network 22 may be an Ethernet or other suitable type of local network. The local equipment 24 connected to the local area network 22 may be servers, databases, or other suitable devices accessed by the customer premise equipment 20.

The communications network 14 is a wide area network (WAN) that connects the customer sites 12 to the management site 16. For the embodiment of FIG. 1, the communications network 14 is a frame relay network. The frame relay network uses a packet-switching protocol for connections between remote locations. The packets are in the form of frames which are variable in length. An advantage to the frame relay network is that data packets of various sizes associated with virtually any native data protocol can be accommodated. As a result, the frame relay network is protocol independent because it does not undertake a lengthy protocol conversion process and offers fast and less expensive switching and/or routing. The frame relay network may include the series of hubs, switches, bridges, and routers for transmitting traffic between the customer sites 12 and the management site 16.

The frame relay network includes operational links 40 and management links 42 for the customer premise equipment 20 of each client site 12. The operational link 40 connects the customer premise equipment 20 to a remote host 44 which provides database and other operating information for the customer premise equipment 20. The remote host 44 may be a server or other suitable device.

The management links 42 form a robust management network 46 within the communications network 14. In one embodiment, as described in more detail below, each management link 42 includes an embedded channel defined in a network trunk. The network trunk may be a T1 and the embedded channel may be a private virtual channel (PVC).

For the embodiment of FIG. 1, a separate management link 42 connects the customer premise equipment 20 of each site 12 to the management site 16. It will be understood that a single management link 42 may be used to connect a plurality of items of customer premise equipment 20 from the same or different sites 20 to the management site 16 as long as the Internet Protocol addresses connected through link 42 are unique. Thus, for example, if a customer assigns its premise equipment 20 Internet Protocol addresses that are internally unique, then a single management link 42 may be used to connect that customer's equipment to the management site 16. Similarly, if divisions or segments of the customer's equipment or groups of customers have Internet Protocol addresses that are unique among themselves, the customer premise equipment 20 for those divisions, segments, or groups may be connected to the management site 16 through a single management link 42.

The management site 16 includes a switch 50, a plurality of customer servers 52A, 52B, and 52C, a local area network 54, and a management station 56. The switch 50 includes a separate input 58 for each management link 42. The switch 50 routes traffic based on the input 58 or link 42 from which the traffic is received. Thus, traffic received from the customer premise equipment 20 of customer site 12A is routed through the switch 50 to the customer server 52A. Similarly, traffic received from the customer premise equipment 20 of customer site 12B is routed through the switch 50 to the customer server 52B and traffic received from the customer premise equipment 20 of customer site 12C is routed through the switch 50 to the customer server 52C. The switch 50 may be a digital cross connect switch, a router with static routing, or other device operable to direct traffic based upon the input or line from which the traffic was received.

For the embodiment of FIG. 1, the switch 50 is connected to the servers 52 via multiple ports 59. This allows traffic to be directed from a management link 42 to a server 52 without additional addressing by the switch 50. Alternatively, the switch 50 may be connected to the servers 52 via the local area network 54. In this embodiment, the switch 50 addresses traffic to the servers 52 on the local area network 54 based on the input 58 or link 42 on which the traffic was received.

The customer servers 52 each include a memory 61 for storing downloaded traffic. In one embodiment, performance data for the customer premise equipment 20 of a customer site 12 may be automatically downloaded and stored in the memory 61 of the customer server 52 at scheduled intervals. In this embodiment, for example, the performance data may be downloaded every 24 hours. Additionally, the performance data may be downloaded upon request from the management station 56.

The management station 56 is a work station or other suitable device operable to access and manage the client sites 12. The management station 56 is connected to this switch via the local area network 54. The local area network 54 may be an Ethernet or other suitable local network.

The management station 56 uses addresses associated with the switch inputs 58 to distinguish and thus individually access the customer premise equipment 20 of the customer sites 12. An address is associated with an input 58 when it is, in whole or in part, the address of the input 58, is based upon the input address, or capable of being traced back to or related to the input 58. Using addresses associated with the switch inputs 58, the management station 56 is able to indirectly access customer premise equipment having a same Internet Protocol address. Accordingly, customer sites 12 can be managed without the time consuming and costly task of maintaining unique Internet Protocol addresses for each item of customer premise equipment 20.

Figure 2:
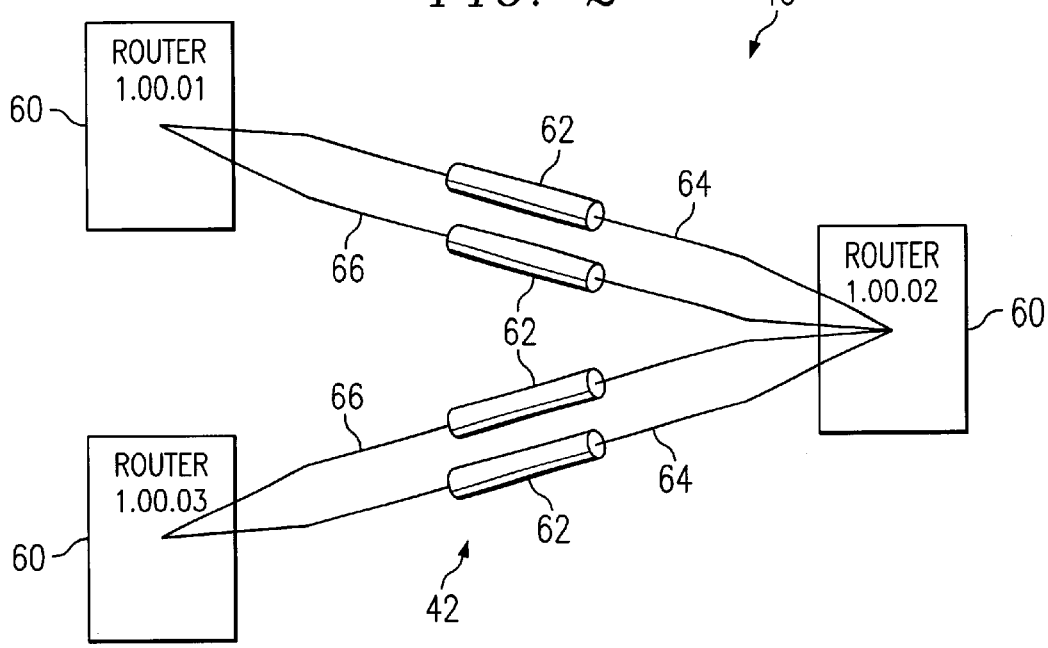
FIG. 2 is a schematic block diagram illustrating primary and secondary embedded channels for the management network of FIG. 1.

FIG. 2 illustrates details of the management network 46. As previously described, the management network 46 includes robust maintenance links 42 that provide communication between the client and management sites 12 and 16.

Referring to FIG. 2, the management network 46 includes a plurality of routers 60 connected by network trunks 62. Primary embedded channels 64 and secondary embedded channels 66 are defined in the network trunks 62. In one embodiment, the network trunks 62 are T1s and the embedded channels 64 and 66 are private virtual channels. The private virtual channels 64 and 66 provide what appears to be dedicated lines without the cost associated with such lines. The private virtual channels 64 and 66 follow a predefined path between routers 60 and other equipment of the management network 46. In accordance private virtual channel standards, data is transmitted in accordance with backward and forward congestion protocols.

The primary private virtual channel 64 carries management channel traffic between the customer and client sites 12 and 16 in normal operation. The secondary private virtual channel 66 carries the channel traffic between the customer and management sites 12 and 16 in the event of a fault condition on the primary embedded channel 64. Accordingly, communications, and thus management, of the customer premise equipment 20 is maintained even in the presence of a fault on a management link 42.

Figure 3:
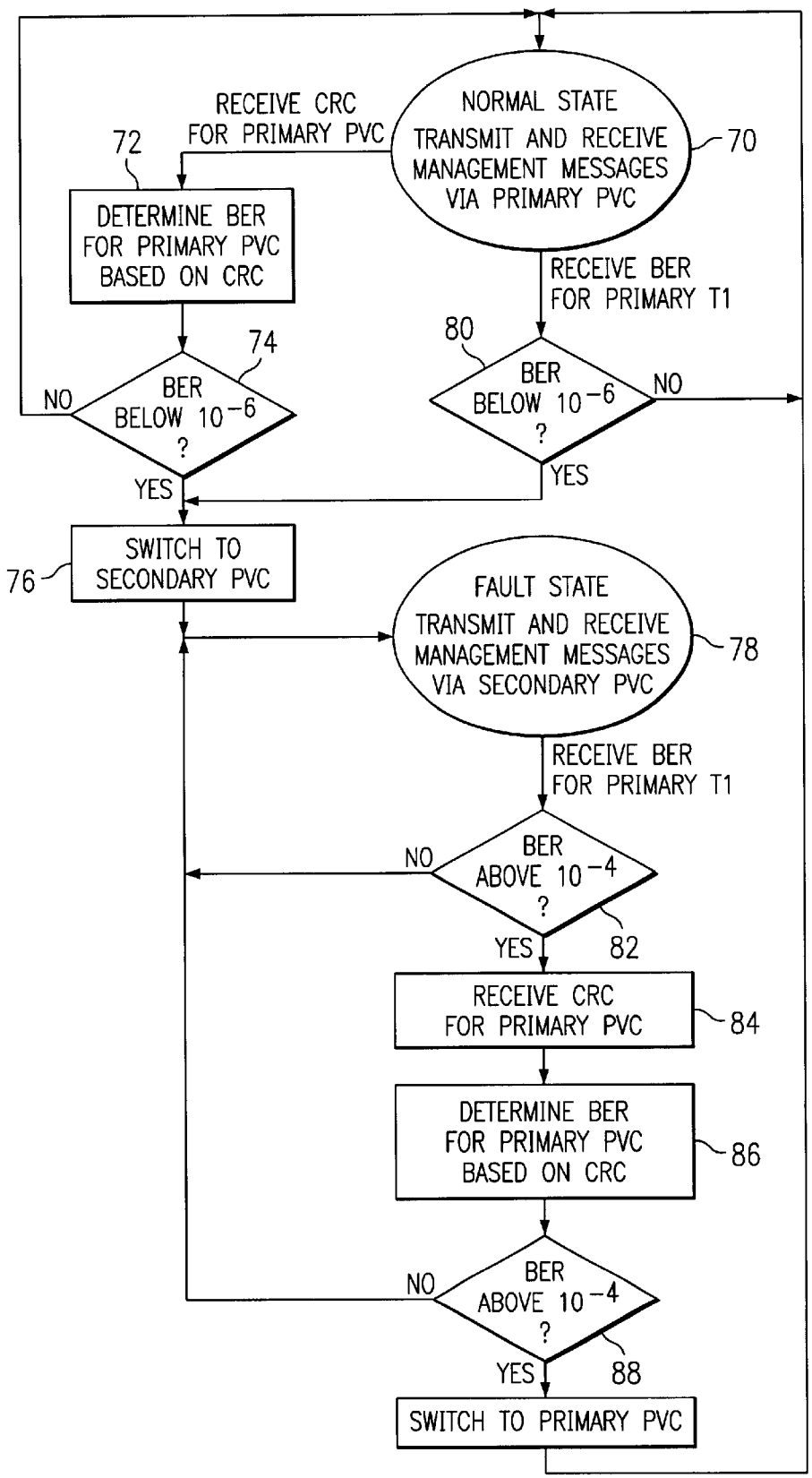
FIG. 3 is a flow diagram illustrating a method of automatic line protection switching between the primary and secondary embedded channels of the management network of FIG. 2.

FIG. 3 illustrates a method of automatic line protection switching between the primary and secondary private virtual channels 64 and 66 of the management network 46. The method is independently conducted by the routers 60 at each end of the primary and secondary private virtual channels. As a result, the routers 60 independently switch between the primary and secondary private virtual channels 64 and 66 in unison and without the communication of private virtual channel fault messages.

Referring to FIG. 3, in a normal state 70 traffic is transmitted and received between transmit and receive nodes via the primary private virtual channel 64. The node may be routers, switches, hooks, bridges or other equipment capable of selectively directing traffic in the management network 46. In the normal state 70, each node independently monitors a check sum value of the primary private virtual channel 64. When a check sum value for the primary private virtual channel 64 is received, state 70 leads to step 72. At step 72, the node determines a bit error rate (BER) for the primary private virtual channel 64 based on the check sum value for the channel 64. Next, at decisional step 74, the node determines if the bit error rate is below $10^{-6}$. If the bit error rate is not below $10^{-6}$, then the No branch of decisional step 74 returns to normal state 70. If the bit error rate is below $10^{-6}$, then a fault condition exists on the primary private virtual channel 64 and the Yes branch of decisional step 74 leads to step 76. At step 76, the node switches from the primary private virtual channel 64 to the secondary private virtual channel 66. Step 76 leads to fault state 78 in which traffic is transmitted and received via the secondary private virtual channel 66.

Returning to normal state 70, each node also independently monitors the bit error rate of the network trunk 62. The bit error rate may be independently determined by each node based on a check sum value or may be provided in accordance with trunk transmission protocol. In response to receiving the bit error rate of the network trunk 62, state 70 leads to decisional step 80. At decisional step 80, the node determines if the bit error rate for the network trunk 62 is below $10^{-6}$. If the bit error rate is not below $10^{-6}$, the No branch of decisional step 80 returns to normal state 70. If the bit error rate of the network trunk 62 is below $10^{-6}$, a fault condition exists on the network trunk 62 and the Yes branch of decisional step 80 leads to step 76. As previously described at step 76, the node switches from the primary private virtual channel 64 to the secondary private virtual channel 66. Next, at the fault state 78, traffic is transmitted and received via the secondary private virtual channel 66.

In the default state 78, each node continues to monitor the network trunk 62 and the primary private virtual channel 64 for a non fault condition. In response to receiving a bit error rate for the network trunk 62 carrying the primary private virtual channel 64, fault state 76 leads to decisional step 82. At decisional step 82, the node determines if the bit error rate for the network trunk 62 is above $10^{-4}$. If the bit error rate is not above $10^{-4}$ then a fault condition continues to exist within the network trunk 62 and the No branch of decisional step 82 returns to fault state 78. If the bit error rate of the network trunk 62 is above $10^{-4}$, then a non fault condition exits in the network trunk 62 and the Yes branch of decisional branch 82 leads to step 84.

At step 84, the node receives a check sum value for the primary private virtual channel 64. Proceeding to step 86, the node determines the bit error rate for the primary private virtual channel 64 based on the check sum value. Next, at step 88, the node determines if the bit error rate for the primary private virtual channel 64 is above $10^{-4}$. If the bit error rate for the primary private virtual channel 64 is not above $10^{-4}$, then a fault condition continues to exist in the primary private virtual channel 64 and the No branch of decisional step 88 returns to the fault state 78. If the bit error rate of the primary private virtual channel 64 is above $10^{-4}$, then a non fault condition exists in the primary private virtual channel 64 and the Yes branch of decisional step 88 leads to step 90. At step 90, the node switches from the secondary primary private virtual channel 66 to the primary private virtual channel 64. Step 90 leads to normal state 70 in which traffic is transmitted and received on the primary private virtual channel 64.

Thus, each node independently and in unison switches between the primary and secondary private virtual channels 64 and 66 in response to the same fault and non fault conditions. The fault and non fault conditions may be any suitable condition of the network trunk and/or private virtual or other embedded channel that can be obtained or determined by the nodes. In this way, automatic line protection switching is provided for private virtual channels independent of protection for network trunks.

Although the present invention has been described with several embodiments, various changes and modifications may be suggested to one skilled in the art. It is intended that the present invention encompass such changes and modifications as fall within the scope of the appended claims.

What is claimed is:

1. A method for automatic line protection switching between a primary embedded channel for carrying channel traffic from a transmit node to a receive node in normal operation and a secondary embedded channel for carrying the channel traffic from the transmit node to the receive node in the event of a fault condition on the primary embedded channel, comprising:

in response to a fault condition in the primary embedded channel detected at the transmit node, automatically switching at the transmit node transmission of the channel traffic from the primary embedded channel to the secondary embedded channel;

in response to the same fault condition in the primary embedded channel detected at the receive node, automatically switching at the receive node reception of the channel traffic from the primary embedded channel to the secondary embedded channel; and wherein the transmit node and the receive node independently switch between the primary embedded channel and the secondary embedded channel absent the communication of a channel fault message.

2. The method of claim 1, wherein the fault condition is a bit error rate of the primary embedded channel below $10^{-6}$.

3. The method of claim 2, further comprising at each of the transmit and the receive node:

receiving a check sum value associated with the primary embedded channel; and determining the bit error rate of the primary embedded channel based on a check sum value.

4. The method of claim 1, wherein the embedded channels are each a private virtual channel (PVC) of a high bandwidth transmission line.

5. The method of claim 1, wherein the transmit and receive nodes are routers.

6. The method of claim 1, further comprising:

in response to a non fault condition in the primary embedded channel detected at the transmit node, automatically switching at the transmit node transmission of the channel traffic from the secondary embedded channel to the primary embedded channel; and in response to the same non fault condition in the primary embedded channel detected at the receive node, automatically switching at the receive node reception of the channel traffic from the secondary embedded channel to the primary embedded channel.

7. The method of claim 6, wherein the non fault condition is a bit error rate of the primary embedded channel above $10^{-4}$.

8. The method of claim 1, further comprising:

in response to a transmission line fault condition detected at the transmit node in a transmission line including the primary embedded channel, automatically switching at the transmit node transmission of the channel traffic from the primary embedded channel to the secondary embedded channel; and in response to the same transmission line fault condition detected at the receive node in the transmission line, automatically switching at the receive node reception of the channel traffic from the primary embedded channel to the secondary embedded channel.

9. The method of claim 8, wherein the transmission line fault condition is a bit error rate of the transmission line below $10^{-6}$.

10. The method of claim 8, further comprising:

in response to a non fault condition in the primary embedded channel and a transmission line non fault condition in a transmission line including the primary embedded channel detected at the transmit node, automatically switching at the transmit node transmission of the channel traffic from the secondary embedded channel to the primary embedded channel; and in response to the same non fault condition in the primary embedded channel and the same transmission line non fault condition in the transmission line detected at the receive node, automatically switching at the receive node reception of the channel traffic from the secondary embedded channel to the primary embedded channel.

11. The method of claim 10, wherein the non fault condition is a bit error rate of the primary embedded channel above $10^{-4}$ and the transmission line non fault condition is a bit error rate of the transmission line above $10^{-4}$.

12. A communications network, comprising:

a transmit node;

a receive node;

a first transmission line extending between the transmit and receive nodes, the first transmission line including a primary embedded channel for carrying channel traffic between the nodes in normal operation;

a second transmission line extending between the transmit and receive nodes, the second transmission line including a secondary embedded channel for carrying the channel traffic between the nodes in the event of a fault condition on the primary embedded channel;

the transmit node operable to automatically switch transmission of the channel traffic from the primary embedded channel to the secondary embedded channel in response to a fault condition in the primary embedded channel detected by the transmit node;

the receive node operable to automatically switch reception of the channel traffic from the primary embedded channel to the secondary embedded channel in response to the same fault condition in the primary embedded channel independently detected by the receive node; and wherein the transmit node and the receive node independently switch between the primary embedded channel and the secondary embedded channel absent the communication of a channel fault message.

13. The communications network of claim 12, wherein the fault condition is a bit error rate of the primary embedded channel below $10^{-6}$.

14. The communications network of claim 13, wherein the transmit and receive nodes are each operable to determine the bit error rate of the primary embedded channel based on a check sum value associated with the primary embedded channel.

15. The communications network of claim 12, wherein data is transmitted on the embedded channels in accordance with a backward and forward congestion protocol.

16. The communications network of claim 12, wherein the embedded channels are private virtual channels (PVC) of the transmission lines.

17. The communications network of claim 12, wherein the transmit and receive nodes are routers.

18. The communications network of claim 12, further comprising:

the transmit node operable to automatically switch transmission of the channel traffic from the secondary embedded channel to the primary embedded channel in response to a non fault condition in the primary embedded channel detected by the transmit node; and the receive node operable to automatically switch reception of the channel traffic from the secondary embedded channel to the primary embedded channel in response to the same non fault condition in the primary embedded channel independently detected by the receive node.

19. The communications network of claim 18, wherein the non fault condition is a bit error rate of the primary embedded channel above $10^{-4}$.

20. The communications network of claim 12, further comprising:

the transmit node operable to automatically switch transmission of the channel traffic from the primary embedded channel to the secondary embedded channel in response to a transmission line fault condition detected by the transmit node in the first transmission line; and the receive node operable to automatically switch reception of the channel traffic from the primary embedded channel to the secondary embedded channel in response to the same fault condition independently detected by the receive node in the first transmission line.

\* \* \* \* \*